Jan. 21, 1969   B. P. NUTTER   3,422,896
APPARATUS FOR USE IN DRILL STEM TESTING
Filed Sept. 29, 1966
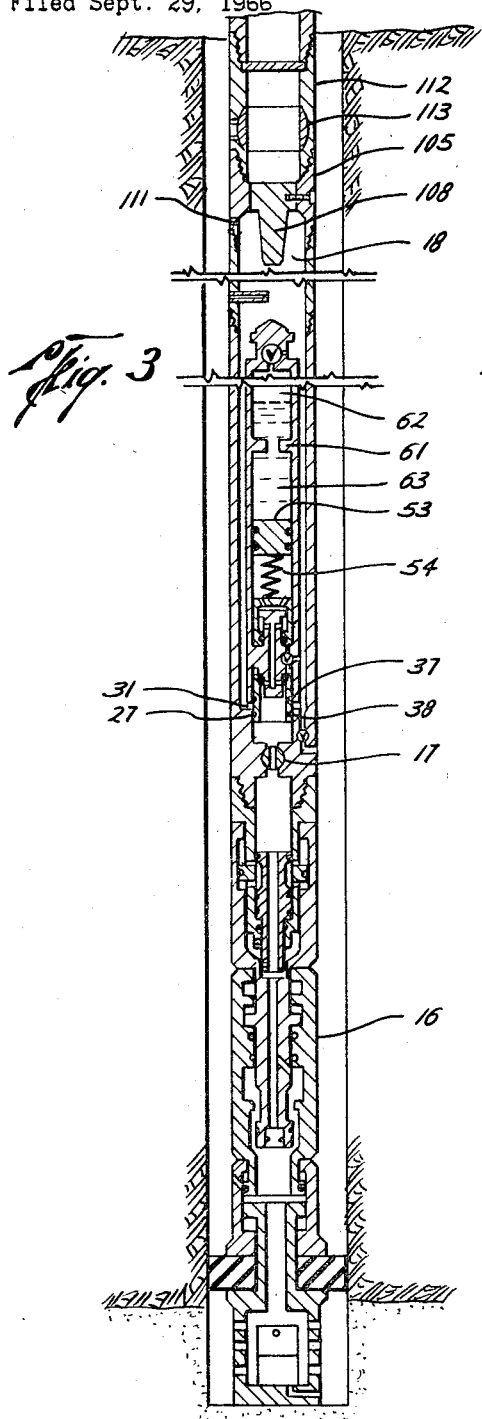
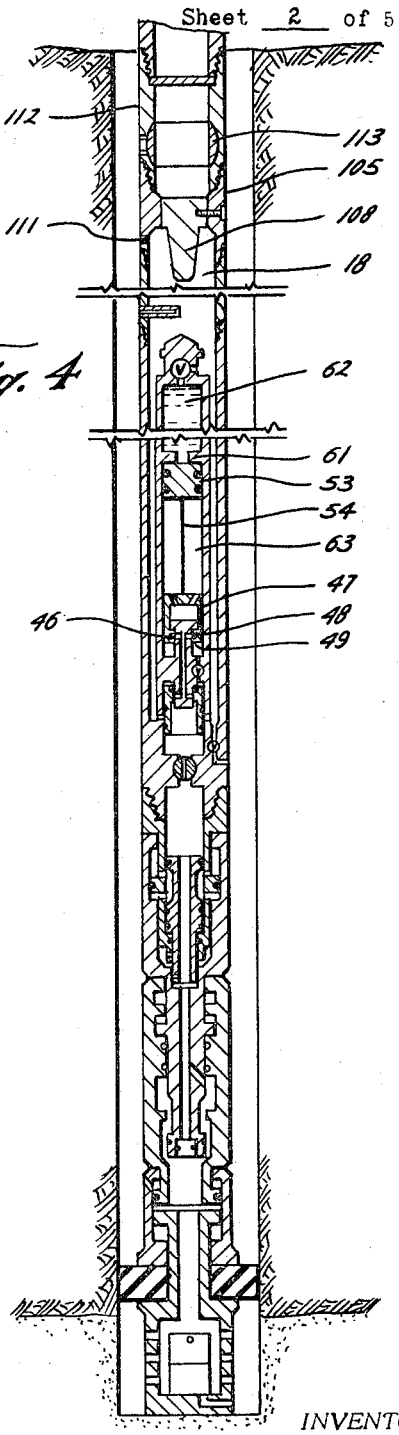
INVENTOR.
Benjamin P. Nutter
BY John E. Holder
ATTORNEY

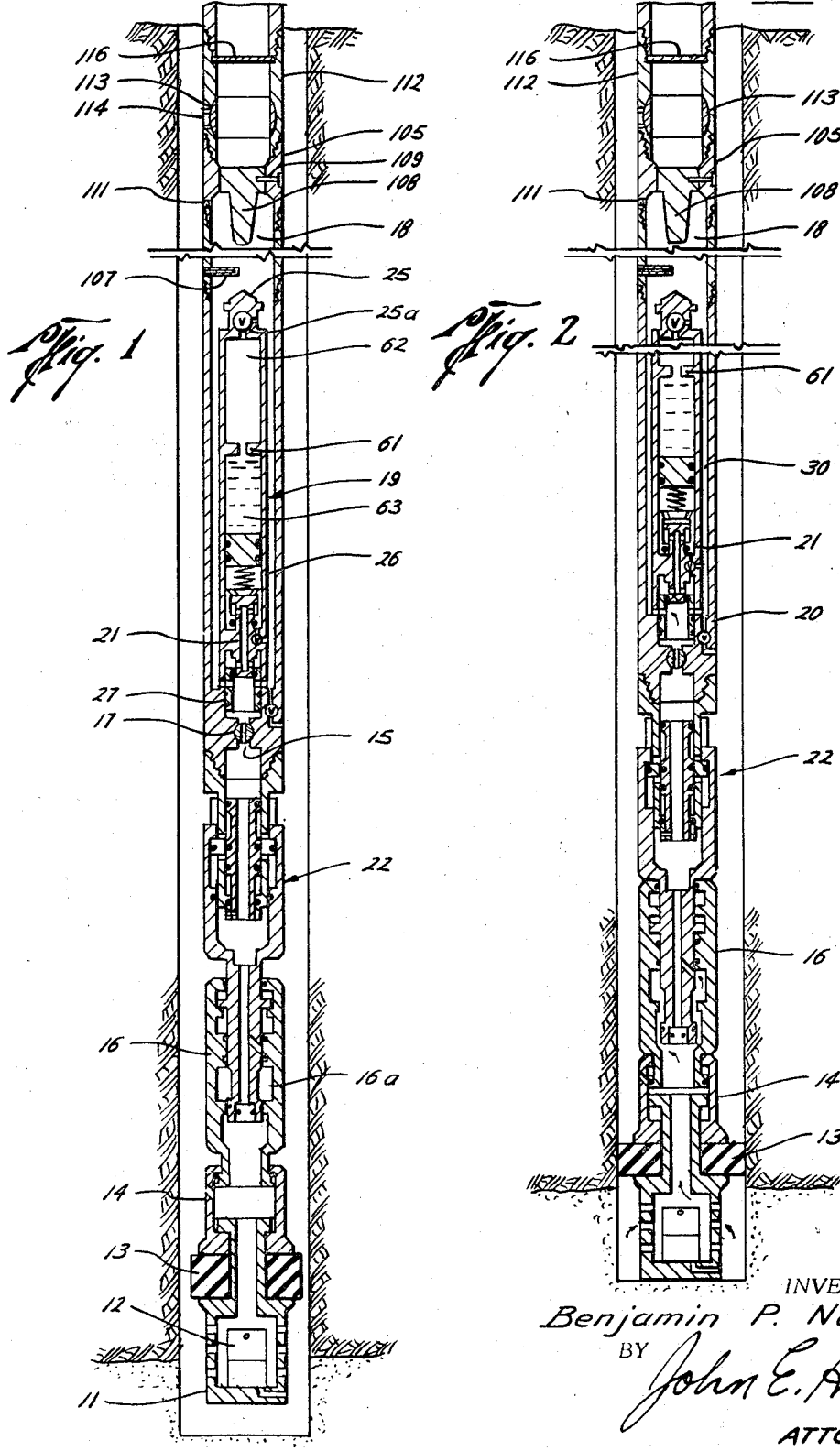

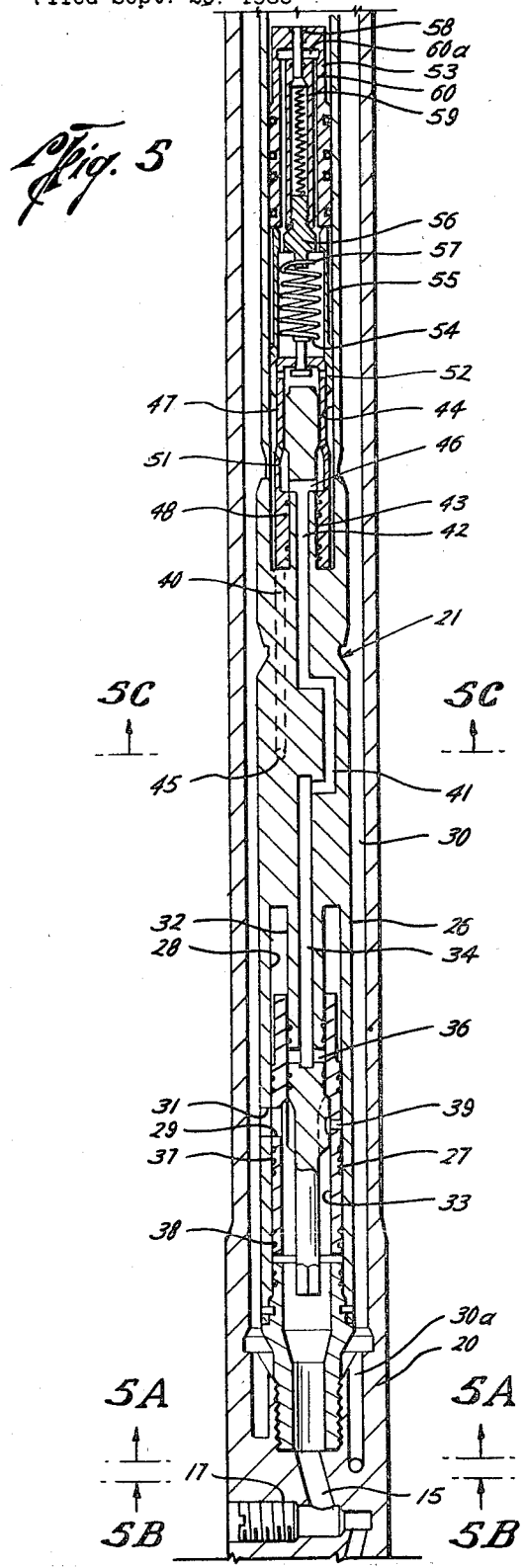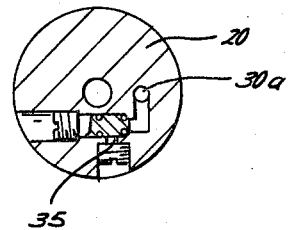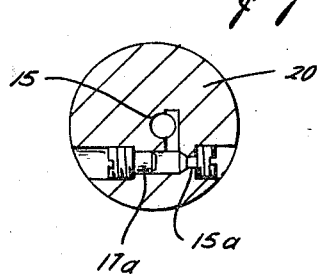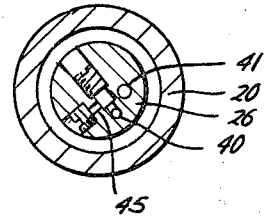

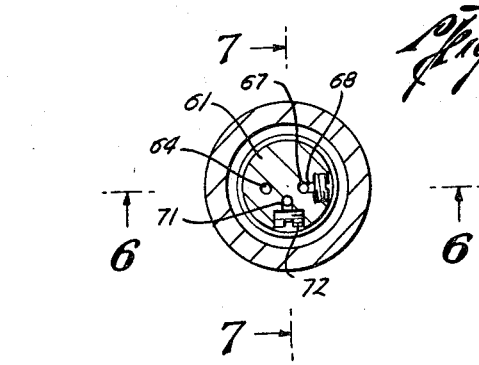
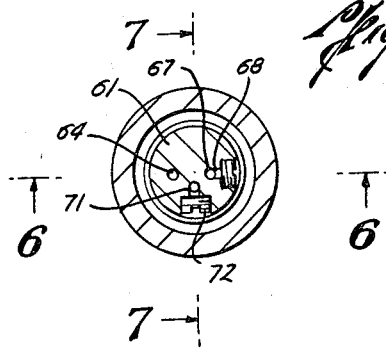
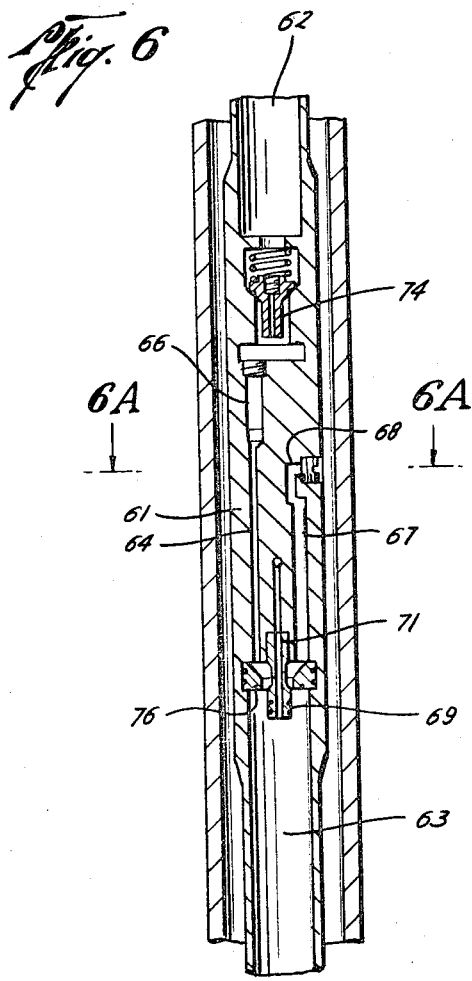
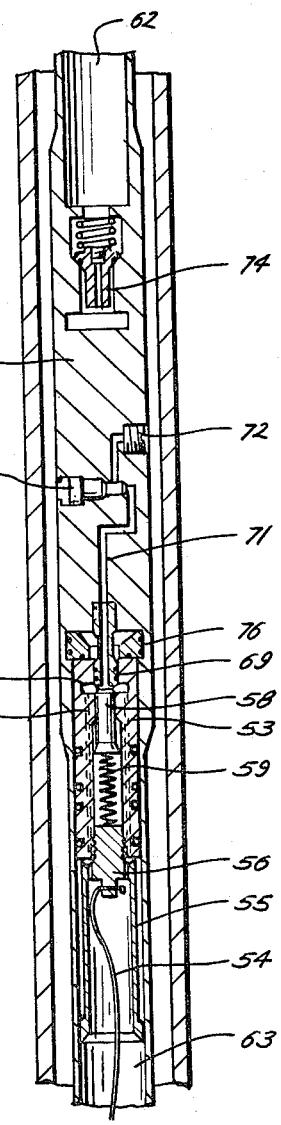

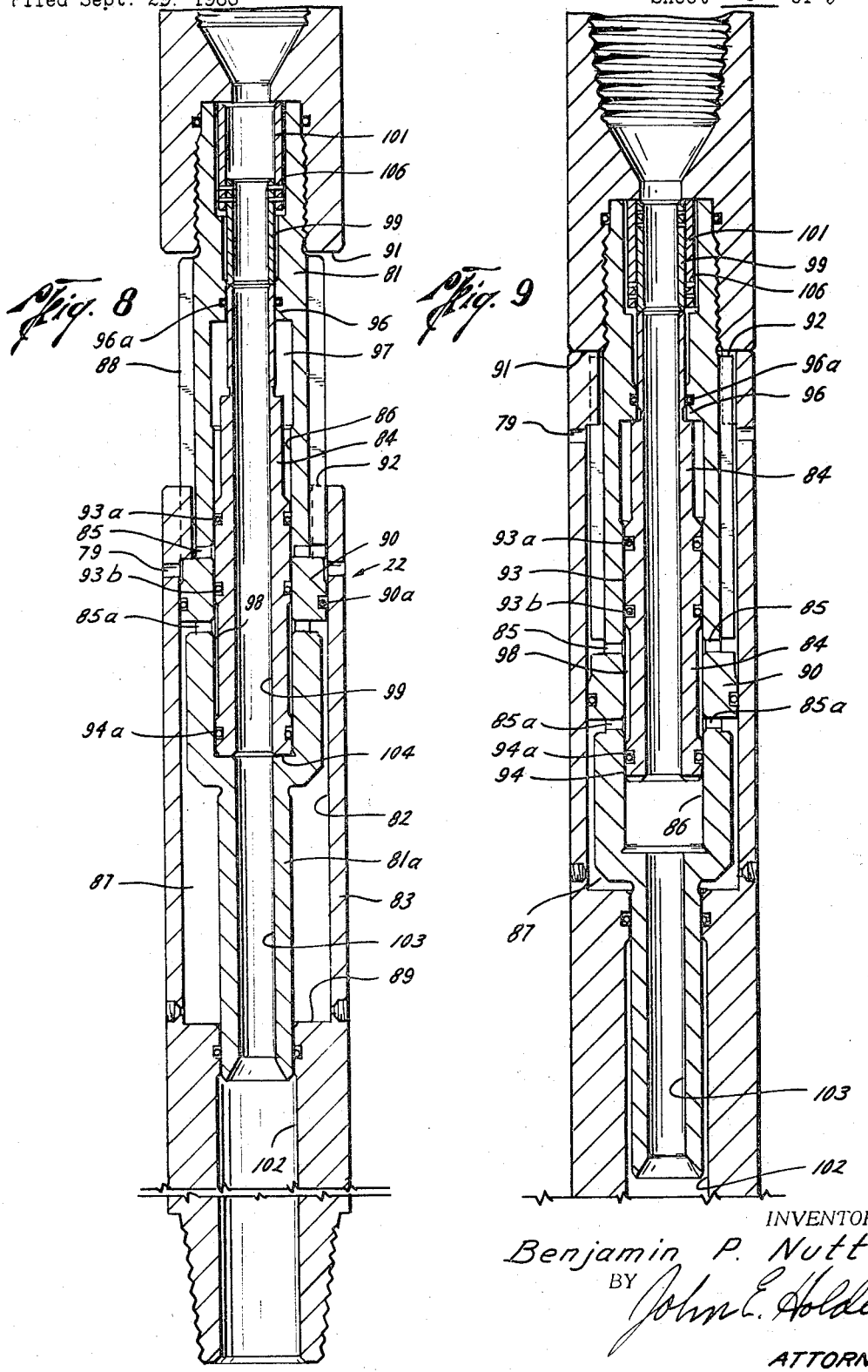

United States Patent Office 3,422,896
Patented Jan. 21, 1969

3,422,896
APPARATUS FOR USE IN DRILL STEM
TESTING
Benjamin P. Nutter, Houston, Tex., assignor to
Schlumberger Technology Corporation, Houston,
Tex., a corporation of Texas
Filed Sept. 29, 1966, Ser. No. 583,037
U.S. Cl. 166—113                                14 Claims
Int. Cl. B21b 43/11; B21b 49/00

ABSTRACT OF THE DISCLOSURE

Drill stem testing apparatus in accordance with the present invention includes packer and tester means disposed in a well bore on a pipe string, an enclosed sample chamber in the pipe string above the tester means for receiving formation fluids, and indicator means for providing a positive surface indication when fluid pressure in the sample chamber has reached a predetermined magnitude, said indicator means including a slip joint device capable of relative movement when a portion thereof is subjected to said pressure.

---

This invention relates to formation testing and, more particularly, to a formation testing apparatus for use in obtaining representative fluid samples from a well bore.

During the drilling of a well, the operator may at some time desire to test a section of the well for production potential. To do this, a testing tool having a normally closed tester valve and a packer is inserted into the well at the lower end of a string of pipe or tubing. The packer is disposed at a location just above the section to be tested and is expanded to close off the bore of the well. Thus, the section for test is isolated from a control fluid which is usually mud. The testing tool includes a pressure recorder which measures the pressure of the isolated formation during the testing operation. The tester valve is opened to permit formation fluids to flow into the string of tubing. This flow may appear at the surface if the pressures are great enough. The tester valve is then closed and a final pressure is recorded.

When the string of tubing is brought to the surface and sections of tubing and tools are removed from the string of tubing, the formation fluids in the tubing are exposed at the surface or floor of the drilling platform. Such exposure of formation fluids may be undesirable under certain circumstances for reasons of safety or secrecy. For this reason, various methods for testing wells under such conditions have been developed. These methods are commonly referred to as "tight hole" or "closed chamber" testing techniques and normally utilize apparatus in the testing operation to prevent uncontrolled flow of formation fluids at the surface. In addition, by means of these techniques, the formation fluids are confined to closed containers so that the results of the test are confidential. The present tight hole testing techniques utilize apparatus which traps the initial production of formation fluids in a closed or segregated chamber in the string of tubing. When it is believed that the chamber is filled, the tester valve is closed and a final shut-in pressure is recorded.

The problem of obtaining a fluid sample qualitatively representative of the reservoir fluid is extremely difficult. The major difficulty is concerned with the necessity of creating a pressure draw down which may cause the reservoir fluid to give off its lighter components as gas. Thus, the rate of flow of the various phases through the formation differs from the ratio of occurrence in the formation. Consequently, the fluid obtained in the sample chamber may deviate from the proper relationship between the gas and liquid in the formation.

Another problem associated with closed chamber testing is that it may be impossible to determine at the surface when or if the chamber is filled since the recovery is limited or confined to a closed section of the tool string.

Additionally, a study of pressure build up in a closed chamber may be hampered by the difficulty in defining the flow time, i.e., the time it takes for the formation to fill a certain volume of the sample chamber. Different methods are available for estimating this time from other observed data. However, in the case of closed chamber testing, the flow time cannot easily be identified because compressibility and flowing gas oil ratio play such an important part in both the flow period and build-up period. This particular problem is pointed out in more detail in an article entitled "Tight Hole and Closed Chamber Testing" from the Journal of Canadian Petroleum Technology, Fall 1964.

Accordingly, it is an object of the present invention to provide new and improved apparatus for conducting a drill stem test which provides a sample representative of the fluid as it exists in the formation.

Therefore, in accordance with the present invention, a drill stem apparatus is provided which limits, the fluid recovery to a portion of the drill pipe which is closed off prior to retrieving the sections of pipe to the earth's surface. The formation fluid enters the sections of pipe through a test valve and if sufficient fluids are present, the fluids normally flow until the sections are filled or a predetermined pressure is reached in the closed off portion. At such time, means are provided to give a surface indication that the pipe sections forming a first chamber are filled. At the same time, a valve is automatically closed to shut off such pipe sections and a second valve is opened which permits the formation fluid to flow into a second chamber against a predetermined pressure. Upon filling of such second chamber, the second valve is automatically closed and the formation is shut in. Thereafter, the test valve is colsed and the string of tools is retrieved to the surface. Fluid in the sections of drill pipe forming the first chamber may be isolated between the ends of the sections by closing valves at each end of the sections or the fluid may be reversed out of the chamber into a closed receptacle to maintain the nature of the recovery as a secret. The second chamber which contains the most representative sample of the formation fluid may be removed from the string of tools for transfer to a place where the fluid sample may be analyzed.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings in which:

FIGURES 1–4 show schematic illustrations of the various operational stages of a string of well tools embodying the principles of the present invention;

FIGURE 5 is a longitudinal sectional view of a sample chamber and valving structure in accordance with the present invention;

FIGURES 5A, 5B and 5C are cross-sectional views of the indicated sections of FIGURE 5;

FIGURE 6 is a detailed sectional view of a portion of the sample section of the tool;

FIGURE 6A is a cross-sectional view taken along lines 6A—6A of FIGURE 6;

FIGURE 7 is a sectional view taken along lines 7—7 of FIGURE 6A; and

FIGURES 8 and 9 are sectional views of an indicator valve used in the tool string.

Referring first to FIGURES 1–4, the string of tools is shown having a perforated anchor 11 and pressure recorder 12 at its lower end. A selectively operable packer 13 is positioned above the perforated anchor. A bypass or equalizing valve 14 is included in the string above the packer to permit fluid flow around the packer when the tool string is being run in the well. Next, a drill stem testing tool 16 is positioned above the bypass valve 14. The tools thus far described as making up the string are shown in greater detail in applicant's copending patent application Ser. No. 333,225, now U.S. Patent No. 3,308,887.

A valve 17 which will hereinafter be referred to as a tight-hole sub is positioned within a longitudinal passage 15 above the test tool, the valve being shown in greater detail in FIGURES 5 and 5B and also described in U.S. Patent No. 3,254,710. Above the tight-hole sub 17 is a sampling section of the tool which is comprised of a first or upper sample chamber 18 made up of one or more sections of drill pipe and a second or lower sample section 19. Tight-hole subs such as those shown in FIGURES 5 and 5B may be positioned at each end of the one or more sections of drill pipe forming the upper sample chamber 18.

The tight-hole subs provide a means for isolating interior sections of a tool string by manipulation of a valve 17 having a control portion exposed to the exterior of the tool string. The valve 17 opens and closes a longitudinal passageway 15 extending through the sub. Another valve and passageway in the sub (as shown in FIGURE 5B) provide a means for opening the passageway 15a to the exterior of the tool for bleeding or draining fluid from the interior of the tool string. Details of the sub are disclosed in the U.S. Patent No. 3,254,710. An indicator valve 22 which is shown in greater detail in FIGURES 8 and 9 is positioned between the sampling section and the testing tool 16.

The lower sample section 19 and valve mechanism 21 associated therewith are incorporated into a removable housing section 26 which is threadedly coupled (see FIGURE 5) at its lower end to the tool housing 20. Attachment means 25 are provided at the upper end of the housing to permit easy removal of the sample section and valve mechanism from the tool string. A valved passageway 25a (shown schematically in FIGURES 1–4) is provided in the upper end of the sample section 19.

Referring to FIGURE 5, the valve mechanism 21 includes a lower sleeve valve 27 slidably positioned within a lower bore 28 in the valve housing. Ports 29 are formed through the wall of the sleeve valve 27 and as shown in FIGURES 1 and 5 are normally in register with ports 31 in the valve housing. Ports 31 in the valve housing in turn are in communication with an annular space 30 between the valve housing 26 and the tool housing 20. The annular space 30 communicates with the chamber 18 formed by sections of drill pipe. The annular space 30 also communicates at its lower end with a downwardly extending passage 30a which, in turn, connects with a plugged transverse port 35 and valve (see FIGURE 5A) which provide communication with the exterior of the tool housing 20. FIGURE 5B shows a cross section of the tight-hole sub which provides the valve 17 for opening and closing passage 15. The sub includes a valve 17a (FIGURE 5B) for opening and closing a passage 15a to the exterior of the sub.

The sleeve valve 27 is slidably positioned about a depending portion 32 of the valve body which is axially positioned within a bore 33 in the sleeve valve. A longitudinal passageway 34 is formed within the depending portion 32, with the passageway 34 extending upwardly through the valve housing. Ports 36 in the depending portion 32 provide communication between the bore 33 in the sleeve and passageway 34 in the housing. Seal means 37, 38 are positioned on the outer wall of the sleeve to seal off and thereby close ports 31 in the housing when the sleeve moves upwardly to a higher position in the bore 28 as shown in FIGURE 3. Shear pins 39 or the like are connected between the sleeve 27 and the depending housing portion 32. The pins 39 normally maintain the sleeve ports 29 aligned with housing ports 31. The pins 39 are shearable to render the sleeve 27 movable relative to the housing upon the application of sufficient fluid pressure to the lower end of the sleeve.

Passageway 34 in the valve housing connects with intermediate passageway 41 which, in turn, connects with longitudinal passageway 42 formed in an upwardly extending portion 43 of valve housing 26. The portion 43 is axially positioned within an upper bore 44 and is sized to provide a space between the portion 43 and the bore 44. A passageway 40, which is shown in dotted lines in FIGURE 5, extends downwardly within the housing 26 and connects with a valved passage 45 (also see FIGURE 5C) leading to the exterior of the valve housing 26. The upper end of the passageway 42 extending through the valve housing portion 43 has ports 46 communicating with the bore 44 of the valve housing. An upper sleeve valve 47 is slidably positioned about the upwardly extending portion 43 and likewise has seal means 48, 49 thereon for closing off the ports 46 when the sleeve valve 47 is moved upwardly relative to the upwardly extending portion 43 of the valve housing. Ports 51 in the sleeve valve 47 are normally positioned opposite ports 46 (as shown in FIGURE 5) to provide communication between the passageway 42 and bore 44. An upper set of ports 52 connect the bore 44 with the upper interior of the sleeve valve above the upwardly extending portion 43.

A segregating piston 53 is slidable within the bore 44 and means 54 are provided to connect the piston 53 with the upper sleeve valve 47. In the preferred embodiment of the apparatus as described herein, such means for connecting the piston and sleeve valve is an extendible stainless steel wire rope. Upon sufficient upward movement of the piston, the wire rope 54 is placed under sufficient tension to move the sleeve valve 47 upwardly where seals 48 and 49 on valve 47 straddle and thereby close off the ports 46 in the upwardly extending portion 43 of the valve housing. The piston 53 includes a cable catcher 55 extending downwardly therefrom about the coil of stainless steel cable 54. A piston cable clevis 56 is provided at the lower end of the piston and attaches to the upper end of the cable by means of a shear pin 57. A piston valve 58 is slidably received in a bore through the upper end of the piston. A segregator piston spring 59 is positioned between the piston valve 58 and the piston cable clevis. The spring 59 normally urges the piston valve 58 in an upward position as shown in FIGURE 5. Passageways 60 extend upwardly through the piston cable clevis and the piston and communicate with transverse passages 60a near the upper end of the piston and communicating with the bore in which the piston valve 58 is slidably received.

Referring to FIGURES 1–4, the lower sample section 19 has an intermediate section 61 dividing the sample section into upper and lower chambers 62 and 63, respectively. This intermediate section 61 dividing the chamber is shown in greater detail in FIGURES 6 and 7 of the drawings. The intermediate section has a longitudinal passageway 64 connecting the upper and lower chambers 62 and 63. A choke 66 is positioned in the passageway to meter fluids flowing from chamber 63 into chamber 62. A check valve 74 is also positioned at the upper end of the intermediate section to permit fluids flowing through passageway 64 and choke 66 to pass into the upper chambers 62 while retarding the flow of fluids in an opposite direction.

Another longitudinal passageway 67 extends part way through the intermediate section from its lower end to a point midway up the section communicating with a plugged transverse bore 68. A transfer mandrel 69 is centrally positioned in the intermediate section and extends downwardly therefrom. A third longitudinal passage 71 (see also FIGURE 7) extends upwardly through the center of the transfer mandrel and the intermediate section to a point part way through the intermediate section and communicates at its upper end with a plugged bore 72. A valve 73 is positioned in the intermediate section to intercept the passageway 71 and thereby provide a means for opening and closing the passageway. The valve 73 is operable by rotation from the exterior of the intermediate section. At the lower end of the intermediate section, an annular seating flange 76 projects downwardly from the end of the intermediate section and spaced outwardly from the transfer mandrel 69. The space around the transfer mandrel between the mandrel and the seating flange provides for fluid communication between chamber 63 and the lower end of passageways 64 and 67.

The valved passageway 25a in the upper end of chamber 62 provides communication between the interior of the upper chamber and the exterior of the lower sampling section 19. This valve is selectively operable from the exterior of the engagement means 25.

FIGURE 8 shows a detailed view of the indicator valve sub 22 schematically shown in FIGURES 1–4 positioned between the sampling section and testing tool 16. The indicator valve has a mandrel 81 slidably positioned within an axial bore 82 extending through the sub housing 83. Ports 79 extend between the bore 82 and the exterior of the housing 83. An inner sleeve valve 84 is slidably positioned within a bore 86 extending through the mandrel 81. Splines 88 on the mandrel slidably engage with spline grooves in the housing 83 to prevent relative rotation therebetween. A shoulder 89 is formed in the bore 82 of housing 83 and forms an annular chamber 87 in the bore of housing 83. An outwardly extending annular piston 90 is formed on the mandrel 81. Piston 90 is slidably reecived in annular chamber 87. Seal means 90a are arranged on the piston 90 to form a sliding seal with bore 82 which forms the inner wall of recess 87. The upper end of the chamber or recess 87 forms an abutment for limiting the upward movement of the piston 90 and mandrel 81 within the housing.

Upper and lower ports 85, 85a respectively are formed through the wall of the mandrel communicating between the bore 86 and the exterior of the mandrel above and below the annular piston 90. An enlarged portion or collar is attached to the upper part of the mandrel 81 forming a shoulder 91 at the lower end of the enlarged portion. A flange 92 extends inwardly from the upper end of the housing 83 to form an abutment for engaging the shoulder 91 and thereby limiting downward movement of the mandrel 81 within housing bore 82.

The sleeve valve 84 has upper and lower outwardly extending flange portions 93, 94 respectively. A pair of spaced O-ring seals 93a and 93b on upper flange 93 provide a seal with bore 86 of mandrel 81. An O-ring seal 94a on lower flange 94 also provides a sliding seal with bore 86 of the mandrel.

An inwardly extending flange portion 96 at the upper end of mandrel 81 slidably engages the upper end of sleeve valve 84. A seal 96a on the inner wall of flange 96 provides a seal therebetween. A chamber 97 is formed between the sleeve 84 and the mandrel bore 86 with the upper and lower ends of the chamber being sealed by seals 96a and 93a respectively. Another chamber 98 is formed between sleeve valve 84 and mandrel bore 86 with the upper and lower ends of the chamber being sealed by seals 93b and 94a on flange portions 93 and 94 respectively. Sleeve valve 84 has a longitudinal bore 99 extending therethrough. A sleeve valve extension member 99 is positioned above and in abutment with the sleeve valve. The upper end of the extension member 99 is telescopically received within the bore of tubular insert 101. Shear pins 106 connect the insert 101 and the extension member 99. The shear pin 106 limits upward movement of the extension member 99 with respect to the insert 101. Fluid pressure is communicated from the bore 102 of the housing through the small bore 103 in the mandrel to the lower end 104 of the sleeve valve 84. The pressure is effective upon reaching a predetermined level to shear pins 106 and move the sleeve 84 and extension 99 upwardly within the mandrel and insert 101 to position chamber 98 over ports 85 and 85a and thereby communicate the ports with one another.

In the operation of the apparatus as described herein, the string of tools is lowered into the well bore to a position at which a formation is to be tested. It is pointed out that various types of packer arrangements may be utilized such as a straddle packer in the event the formation is considerably above the bottom end of the well bore. In the running-in condition as illustrated in FIGURE 1 of the drawings, the bypass valve 14 at the lower end of the tool string is open and the tester valve 16 is closed. The lower sleeve valve 27 in the valve system 21 is in its downward position to provide communication between the tester valve 16 and the upper sample chamber 18 formed by sections of pipe. The valves in the tight hole subs as at 17 and between sections of drill pipe are opened to permit fluid flow through the longitudinal passage upwardly through the valves. The indicator sub is in its unoperated conditions as shown in FIGURES 1, 2 and 8.

FIGURE 2 shows the string of tools at the beginning of the testing operation. The anchor has engaged the lower end of the borehole and the bypass valve in the bypass section 14 is shut. The indicator sub 22 between the tester and sampling section of the tool is still in the unoperated condition. The weight indicator is noted since the operation of the indicator sub will be detected by a change in weight registered on the weight indicator.

At this point, the tester valve is open as shown in FIGURE 2 to receive formation fluid within the tool string as indicated by the arrows in FIGURE 2. If sufficient formation pressure is available, the fluids will flow upwardly through the indicator sub and into the drill pipe forming chamber 18. The pressure generated by both gas and liquid constituents of the formation fluids flowing into the drill pipe is in communication with the lower end of the sleeve valve 84 in the indicator sub. The expected formation pressure is calculated before the test and the shear pin 106 which prevents the indicator sub from operating is arranged to be ruptured by a pressure which is below the expected range of formation pressures in the formation to be tested. The shear pin may, for example, be set to shear at ½ to ⅔ the expected reservoir pressure. When the fluid pressure in the upper chamber 18 has built up to the shear value of the shear pin, the fluid acting on the lower end of the sleeve valve will cause the shear pin to break and the sleeve valve 84 to shift upwardly relative to the mandrel. The sealed chamber 97 is maintained at atmospheric pressure to permit the upward shifting of the sleeve valve.

As shown in FIGURES 3 and 9, this upward shifting of the sleeve valve moves the seal 93b on the sleeve valve above the port 85 in the mandrel 81 thus placing ports 85 and 85a in communication via chamber 98 in the sleeve valve. Fluid such as oil, which is maintained in sealed chamber 87, is discharged through the connecting ports 85, 85a and chamber 98 into the space between the mandrel 81 and housing 82 and out ports 79 to the exterior of the tool. The discharge of fluid from chamber 87 permits the mandrel 81 to move downwardly in housing 83 until shoulder 91 on the mandrel abuts the top of shoulder 92 on the housing. This downward movement of the mandrel 81 permits the tool string thereabove to shift downwardly which, in turn, registers on the weight indicator to show that the indicator sub has operated. This operation of the indicator sub, in turn, is indicative that the upper chamber 18 of the tool has filled or reached a certain pressure and provides a means for measuring the time period that lapses between the opening of the test valve 16 and the filling of the upper chamber 18. Since the volume of chamber 18 is known, the rate of fluid flow can readily be calculated.

By placing the indicator sub at the lower end of chamber 18 instead of above chamber 18, the indicator will operate in response to a total liquid recovery thus being independent of pressure resulting from gas production. In the event of a high ratio of liquid recovery, the liquid head will operate the indicator sub. An indicator sub at the upper end of the chamber will not be operable under high liquid ratio production until the chamber is completely filled. Under such conditions, if the upper sample chamber 18 completely fills with liquid before opening of the lower chamber, the flow may be stabilized when the lower chamber 62 opens thus affecting the taking of a flowing sample in lower chamber 62.

Subsequent to the above-described operation of the indicator sub, pressure in the upper chamber 18 and tool string continues to build up due to the formation pressure communicating therewith. Referring to FIGURE 5, the lower sleeve valve 27 in the valve mechanism 21 is secured to the housing by means of one or more shear pins 39. The shear pin 39 is designed to be sheared by a pressure greater than that necessary to shear the pin 106 to operate the indicator sub 22. The increase in pressure within the upper chamber 18 is also in communication with the lower end of the lower sleeve valve 27 causing the valve to shear the pin 39 and move upwardly within the bore 28 of valve housing 26. Such upward movement of the sleeve valve 27 places seal means 37 and 38 thereon into a position straddling the flow ports 31 in the housing 26. The upward movement of sleeve valve 27 also places ports 36 in the downwardly extending portion 32 of the valve housing in communication with bore 33 in sleeve valve 27. The opening of ports 36 permits formation fluid entering the tool to flow upwardly through passageways 34, 41 and 42 in the valve housing and into the lower end of sample chamber 63 below piston 53.

When the tool is in condition for being operated, the lower chamber 63 in the lower sampling section is filled with water between the piston and the intermediate section 61 separating the upper and lower chambers 62 and 63 therein. The upper chamber is filled with air with the choke 66 between chambers 62 and 63 restricting flow of water from chamber 63 into chamber 62 during the operation of the tool. Therefore, fluid entering the sample chamber on the lower side of the piston 53 pushes the piston upwardly against the water cushion in the lower chamber above the piston 53. The choke 66 between the chambers 62 and 63 provides a back pressure against the movement of the piston 53 which, in turn, maintains a back pressure against fluids flowing out of the formation during this portion of the test. It is readily seen that the size of the choke 66 between the air and water chambers may be regulated to adjust the back pressure to be applied against the formation during the flow into sampler 19. This back pressure is preferably adjusted to be the same as the pressure required to shear pin 39 opening the lower chamber. By maintaining a constant pressure on the formation, the sample will be much more representative than if the pressure shifts rapidly during taking of the sample.

As the piston 53, moving upwardly in the chamber 63, reaches the top of its stroke, the wire 54 which attaches thereto is tensioned to lift the upper sleeve valve 47 relative to the upwardly extending portion 43 of the valve housing. This upward movement of the sleeve valve 47 causes seal means 48 and 49 on the upper sleeve valve to straddle ports 46. This, in turn, closes the ports 46 from communication with the lower end of the sample chamber 63 to trap the recovered fluid therein under the pressure at which it was received within the chamber.

Referring now to FIGURES 6 and 7 of the drawings, it is seen that as the piston 53 moves upwardly in chamber 63 to lift sleeve valve 47 and thereby close the lower end of the chamber, the piston 53 engages the lower end of the intermediate section 61 which separates the chambers 62 and 63. First contact of the intermediate section with the piston is made by the transfer mandrel 69 protruding downwardly from the intermediate section. The transfer mandrel 69 engages the piston valve 58 in the upper end of piston 53 and moves the piston 58 downwardly within the piston 53 until the upper end of the piston 53 seats against the annular seating flange 76. At this point, the transfer mandrel has extended sufficiently into the upper end of the piston 53 to move the piston valve downwardly to a position exposing the ports 60a connecting with passageway 60 within the piston 53. Such opening of the ports 60a places the sample chamber 63 in communication with the passageway 71 within intermediate section 61. Upon retrieval of the tool string to the surface, this permits the bleeding of pressure from the sample chamber through the plugged port 72 by operation of valve 73 which opens and closes passageway 71.

Knowing the time that was taken to fill the upper sample chamber 18, the relative time required to fill the lower sample chamber 19 may be calculated so that it is approximately known when the lower chamber should become filled and automatically closed as set forth above. FIGURE 4 shows the lower chamber closed to take a final shut-in pressure recording of the formation. At the completion of the final shut-in period, the tester valve is closed, the packer is unset, and the tool string is recovered from the well bore.

In the event that an indication is not received at the surface that the indicator sub 22 has operated, it may be assumed that there was not sufficient formation pressure to fill the upper sample chamber in the amount necessary to operate the indicator sub. In such case, the test valve 16 is closed to trap the last flowing sample within a sample chamber 16a in the test valve. A final shut-in is then taken and subsequently the string of tools is removed from the well bore.

As the string of tools is brought to the surface and uncoupled, each of the tight-hole subs between sections of pipe and tools is closed from the exterior of the tool. The closure of the longitudinal passage in each tight-hole sub closes the ends of the sections of pipe or tools and prevents the fluid content therein from being disclosed at the surface. The tools and sections of pipe forming the upper sample chamber may then be removed from the well site for examination in privacy. In the event extreme secrecy is required, grease or other suitable fluid may be injected into the sub through the exterior passageway (not shown) to displace or mix with fluid which may be trapped between the valves of adjacent tight-hole subs. Such a procedure is set forth in U.S. Patent No. 3,254,710.

An alternative arrangement for recovering the formation fluids may be provided by placing a reverse circulating valve 107 (FIGURES 1–4) at the lower end of the upper sample chamber 18. The circulating valve may be activated by a drop bar 108 in sub 105. The drop bar 108 is released at the upper end of the upper sample chamber as the upper end of the sample chamber is brought to the surface. A threaded pin member 109 holds the drop bar 108 in position in the sub with the pin member being operable from the exterior of the sub to release the drop bar. Upon the opening of the reverse circulating valve, pressure is applied to the annular space in the well bore to reverse fluids out of the upper sample chamber 18 into a closed container at the surface. This method maintains the secrecy of the fluids contained within the sample chamber and also prevents the spillage of formation fluids at the surface for reasons of safety or cleanliness. A port 111 is also provided in sub 105 to provide means for bleeding pressure from chamber 18 before releasing the drop bar 108. As shown in FIGURES 1–4, a sub 112 is positioned above bar dropper sub 105. Sub 112, which is an alternative embodiment of the tight-hole sub, has a full opening ball valve 113 positioned therein with valve 113 having a control portion 114 exposed to the exterior of the tool. The full opening valve 113 provides a means for shutting off the upper end of the chamber 18 before connecting flow means to the upper end of the pipe to recover fluids therefrom under conditions of secrecy. A disc valve 116 is operable by dropping a bar at the surface to open the string of tools and thereby permit the entry of a string shot or other device into the tool string. The bar 108 in sub 105 is also arranged to be removed from its position by dropping a bar from the surface should it be desirable to lower a device through the string of tools. A similar arrangement of the bar drop sub and reverse circulating valve is set forth in copending application Ser. No. 465,432 now Patent No. 3,353,609.

If the bar dropper sub is not included in the tool string, the pipe is pulled to the surface until valve 113 appears at the surface. A manifold is hooked up, pressure read, and the pressure bled down. A flow head is then installed with a bar dropping sub therein. Thereafter, the normal reversing out procedure is followed as outlined above.

When the tool section containing the lower sample chamber 19 has been retrieved to the surface, the sample chamber 19 is removed from such section by applying a tool to the head 25 of the section and unthreading the section at its lower end for removal from the housing 20. Before removing the sampler section, fluids in the lower end thereof, below sleeve valve 27, may be drained by means of the valve 17a which is shown in FIGURE 5B. Even if fluids in sample section 18 were reversed out as set forth above, formation fluids would still be in the tool string below the reversing valves 107. Of course, if secrecy is desired, the fluids which are in the annular space 30 between the sample section housing 26 and the tool housing 20 may be drained therefrom by means of the valved passage 35 which is shown in FIGURE 5A.

After removal of the sample section 19 from the tool at the surface, fluids in the lower sample chamber 63 thereof are removed in the following manner: Referring to FIGURE 5C, a plug accessible from the exterior of the sample section covers a passageway 45 communicating with sample chamber 63 by means of vertical passageway 40. A closed container may be connected with the passageway 45 and then the valve shown in FIGURE 5C is opened to place the closed container and sample chamber in communication. Since draining the fluids from the sample chamber by gravity may be a very time consuming operation, means are provided for speeding up the operation. Referring to FIGURES 6 and 6A, a pressure source (not shown) may be attached to passageway 68 by removal of the plug therefrom. Such pressure source may be in the form of a $CO_2$ bottle. Upon application of pressure to the passageway, such pressure is communicated through the passageway 67 to the upper end of piston 53. This pressure forces the piston 53 downward within the sample chamber 63 causing fluids to be expelled from the opposite end of chamber 63 through the passageways 40 and 45 and into a closed chamber. Of course, before the draining operation is attempted, pressure may be bled off from the sample chamber by means of the passageway covered by plug 72, which passageway communicates with passageway 71 and the interior of the sample chamber.

In the event any gas may have leaked by the segregating piston 53 into the upper chamber 62, a valve means 25a at the upper end of the upper chamber may be opened to bleed off any gas in the upper chamber. This gas may be measured to maintain the known quantity of hydrocarbons within the sample chamber for determing accurate gas oil ratios, etc.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. Apparatus for drill stem testing in a well bore and including packer means on a pipe string for sealing off a section of a well bore, tester means including a test valve in said pipe string for selectively permitting the flow of formation fluid into a string of tools, a slip joint coupled in said pipe string, and means for preventing movement of said slip joint except in response to pressure within said string of tools reaching a predetermined level.

2. The apparatus of claim 1 wherein said tester means has sampler means therein for trapping a flowing sample of formation fluids when said test valve is closed.

3. The apparatus of claim 1 wherein said slip joint has telescoping members, said preventing means including shear means which is ruptured when said fluid pressure within said string of tools has reached said predetermined level.

4. The apparatus of claim 1 wherein said string of tools includes first and second fluid receiving chambers, with said slip joint operating to indicate when fluid pressure in one of said fluid receiving chambers has reached a predetermined level.

5. The apparatus of claim 1 wherein said string of tools includes a closure means spaced above said test valve to form a sample receiving chamber in the pipe above said test valve, a passage communicating said chamber with the exterior of said string of tools, and valve means operable from the exterior of said string of tools for opening said passage.

6. The apparatus of claim 5 wherein said string of tools includes a reverse circulating valve at the lower end of said sample receiving chamber and means for selectively operating said reverse circulating valve.

7. In a string of well tools adapted to be lowered into a well bore on a pipe string for sampling formation fluids in a well bore, test valve means for opening said string of tools to formation fluids, an enclosed sample chamber in said pipe string for receiving formation fluids, and indicator means coupled between said test valve means and said sample chamber for providing an indication at the top of the well bore that fluid pressure in said sample chamber has reached a predetermined level.

8. The apparatus of claim 7 and further including valve means for opening the upper end of said sample chamber to the exterior of said pipe string.

9. An indicator sub for use in a string of pipe in a well bore, a pair of telescoping members movable between first and second positions, means for connecting said members with a string of pipe, fluid means for releasably holding said members in one of said positions, and means responsive to fluid pressure in the string of pipe for releasing said fluid means to enable movement of said members to the other of said positions, said releasing means including passage means for venting said fluid means to the exterior of the string of pipe.

10. The apparatus of claim 9 wherein said releasing means further includes valve means movable along one of said members, said passage means including ports in said telescoping members, said fluid means including a sealed chamber in said members containing fluid holding said members in said one position, said valve means being movable to a position communicating said ports with said chamber to release fluid from said chamber and permit movement of said members to said other position.

11. A device for signaling to the surface when the fluid pressure in an enclosed chamber in a well bore has reached a predetermined magnitude, comprising: tubular telescoping members movable relative to each other between longitudinally spaced positions, one of said members being adapted for connection to a running-in string extending upwardly to the earth's surface, the other of said members being anchored relative to the well bore; an initially closed reservoir between said members containing a captive fluid acting to hold said members in one of said positions; and normally closed valve means responsive to a predetermined magnitude of fluid pressure in said enclosed chamber for opening said reservoir to enable release of said captive fluid and movement of said members to said other position, the change of longitudinal relative position of said members being observable at the earth's surface by a change of tension in the running-in string.

12. Apparatus for use in drill stem testing, comprising: inner and outer tubular members telescopically movable between extended and contracted relative positions, said members forming a chamber therebetween containing a captive fluid to hold said members in said extended position; normally closed valve means for opening said chamber whereby said captive fluid can escape to permit relative movement of said members to said contracted position; and releasable means for securing said valve means in closed condition, said releasable means being operable in response to a predetermined magnitude of fluid pressure in said inner member, whereby movement of said members from extended to contracted position provides a positive indication of development of said predetermined magnitude of fluid pressure in said inner member.

13. Apparatus recited in claim 12 wherein said valve means includes a sleeve member forming a lower pressure chamber with said inner member, said sleeve member having a transverse surface subject to the difference between pressures in said inner member and said low pressure chamber.

14. Apparatus recited in claim 12 further including coengageable means for preventing relative rotation between said members.

References Cited

UNITED STATES PATENTS

| | | | |
|---|---|---|---|
| 2,655,217 | 10/1953 | Bagnell | 166—224 |
| 3,032,116 | 5/1962 | Barry | 166—142 X |
| 3,104,712 | 9/1963 | Whitten | 166—100 |
| 3,273,659 | 9/1966 | Reynolds | 166—100 X |
| 3,323,361 | 6/1967 | Lebourg | 73—155 |
| 3,353,609 | 11/1967 | Jensen | 166—224 X |
| 3,356,137 | 12/1967 | Raugust | 166—152 X |

DAVID H. BROWN, *Primary Examiner.*

U.S. Cl. X.R.

73—155; 166—150, 152, 224, 163, 237